(12) United States Patent
Sikdar et al.

(10) Patent No.: US 8,285,961 B2
(45) Date of Patent: Oct. 9, 2012

(54) DYNAMIC PERFORMANCE VIRTUALIZATION FOR DISK ACCESS

(75) Inventors: Som Sikdar, Sunnyvale, CA (US); Erik de la Iglesia, Sunnyvale, CA (US)

(73) Assignee: Grid Iron Systems, Inc., Sunnyvale, CA (US)

( * ) Notice: Subject to any disclaimer, the term of this patent is extended or adjusted under 35 U.S.C. 154(b) by 267 days.

(21) Appl. No.: 12/616,705

(22) Filed: Nov. 11, 2009

(65) Prior Publication Data

US 2010/0122020 A1    May 13, 2010

Related U.S. Application Data

(60) Provisional application No. 61/114,332, filed on Nov. 13, 2008.

(51) Int. Cl.
    *G06F 12/00* (2006.01)
(52) U.S. Cl. .......................... 711/170; 711/114
(58) Field of Classification Search ............ 711/170, 711/114
    See application file for complete search history.

(56) References Cited

U.S. PATENT DOCUMENTS

| | | |
|---|---|---|
| 6,401,147 B1 | 6/2002 | Sang et al. |
| 6,678,795 B1 | 1/2004 | Moreno et al. |
| 6,721,870 B1 | 4/2004 | Yochai et al. |
| 6,789,171 B2 | 9/2004 | Desai et al. |
| 6,810,470 B1 | 10/2004 | Wiseman et al. |
| 7,017,084 B2 | 3/2006 | Ng et al. |
| 7,089,370 B2 | 8/2006 | Luick |
| 7,110,359 B1 | 9/2006 | Acharya |
| 7,856,533 B2 | 12/2010 | Hur et al. |
| 7,870,351 B2 | 1/2011 | Resnick |
| 7,873,619 B1* | 1/2011 | Faibish et al. ............... 707/705 |
| 7,975,108 B1 | 7/2011 | Holscher et al. |
| 2002/0035655 A1 | 3/2002 | Finn et al. |
| 2003/0012204 A1 | 1/2003 | Czeiger et al. |
| 2003/0167327 A1 | 9/2003 | Baldwin et al. |
| 2003/0177168 A1 | 9/2003 | Heitman et al. |
| 2004/0215923 A1 | 10/2004 | Royer, Jr. |
| 2005/0025075 A1 | 2/2005 | Dutt et al. |
| 2005/0195736 A1 | 9/2005 | Matsuda |
| 2006/0005074 A1 | 1/2006 | Yanai et al. |
| 2006/0034302 A1 | 2/2006 | Peterson |
| 2006/0053263 A1* | 3/2006 | Prahlad et al. ............... 711/162 |
| 2006/0075191 A1 | 4/2006 | Lolayekar et al. |
| 2006/0112232 A1 | 5/2006 | Zohar et al. |
| 2006/0218389 A1 | 9/2006 | Li et al. |
| 2006/0277329 A1 | 12/2006 | Paulson et al. |
| 2007/0079105 A1 | 4/2007 | Thompson |
| 2007/0118710 A1* | 5/2007 | Yamakawa et al. ........... 711/165 |

(Continued)

OTHER PUBLICATIONS

Stolowitz Ford Cowger Listing of Related Cases, Feb. 7, 2012.

(Continued)

*Primary Examiner* — Hashem Farrokh
(74) *Attorney, Agent, or Firm* — Stolowitz Ford Cowger LLP

(57) ABSTRACT

A storage control system includes performance monitor logic configured to track performance parameters for different volumes in a storage array. Service level enforcement logic is configured to assign target performance parameters to the different volumes and generate metrics for each of the different volumes identifying how much the performance parameters change for the different volumes responsive to changes in the amounts of tiering media allocated to the different volumes. Resource allocation logic is configured to allocate the tiering media to the different volumes according to the performance parameters, target performance parameters, and metrics for the different volumes.

21 Claims, 8 Drawing Sheets

U.S. PATENT DOCUMENTS

| | | |
|---|---|---|
| 2007/0283086 A1 | 12/2007 | Bates |
| 2008/0028162 A1 | 1/2008 | Thompson |
| 2008/0098173 A1 | 4/2008 | Chidambaran et al. |
| 2008/0162864 A1 | 7/2008 | Sugumar et al. |
| 2008/0215834 A1 | 9/2008 | Dumitru et al. |
| 2008/0250195 A1 | 10/2008 | Chow et al. |
| 2008/0320269 A1* | 12/2008 | Houlihan et al. ............. 711/203 |
| 2009/0006725 A1 | 1/2009 | Ito et al. |
| 2009/0006745 A1 | 1/2009 | Cavallo et al. |
| 2009/0034377 A1 | 2/2009 | English et al. |
| 2009/0110000 A1 | 4/2009 | Brorup |
| 2009/0259800 A1 | 10/2009 | Kilzer et al. |
| 2009/0276588 A1* | 11/2009 | Murase ........................ 711/160 |
| 2009/0307388 A1 | 12/2009 | Tchapda |
| 2010/0011154 A1 | 1/2010 | Yeh |
| 2010/0030809 A1 | 2/2010 | Nath |
| 2010/0080237 A1 | 4/2010 | Dai et al. |
| 2010/0115206 A1 | 5/2010 | de la Iglesia et al. |
| 2010/0115211 A1 | 5/2010 | de la Iglesia et al. |
| 2010/0125857 A1 | 5/2010 | Dommeti et al. |
| 2010/0169544 A1 | 7/2010 | Eom et al. |
| 2010/0174939 A1 | 7/2010 | Vexler |
| 2011/0047347 A1 | 2/2011 | Li et al. |
| 2011/0258362 A1 | 10/2011 | McLaren et al. |

OTHER PUBLICATIONS

Rosenblum, Mendel and Ousterhout, John K., The LFS Storage Manager. Proceedings of the 1990 Summer Usenix. 1990 pp. 315-324.

* cited by examiner

| PERFORMANCE MONITOR 60 | | | | | |
|---|---|---|---|---|---|
| DISK | TIME INTERVAL | READ OPS | READ BLOCKS | TOTAL READ LATENCY | AVERAGE LATENCY |
| A | 1 | 100 | 100,000 | 100 | 1 |
| A | 2 | 300 | 300,000 | 900 | 3 |
| B | 1 | 50 | 5000 | 25 | 0.5 |
| ⋮ | ⋮ | ⋮ | ⋮ | ⋮ | ⋮ |
| N | 2 | 100 | 50,000 | 50 | 0.5 |
| 65A | 65B | 65C | 65D | 65E | 65F |

FIG. 4

| SERVICE LEVEL ENFORCEMENT LOGIC 70 | | | |
|---|---|---|---|
| DISK | TARGET READ OPS | TARGET READ BLOCKS | TARGET LATENCY |
| A | 0 | 0 | 0.5 |
| B | 0 | 2000 | 0.5 |
| ⋮ | ⋮ | ⋮ | ⋮ |
| N | 200 | 0 | 0.5 |
| 75A | 75B | 75C | 75D |

FIG. 5

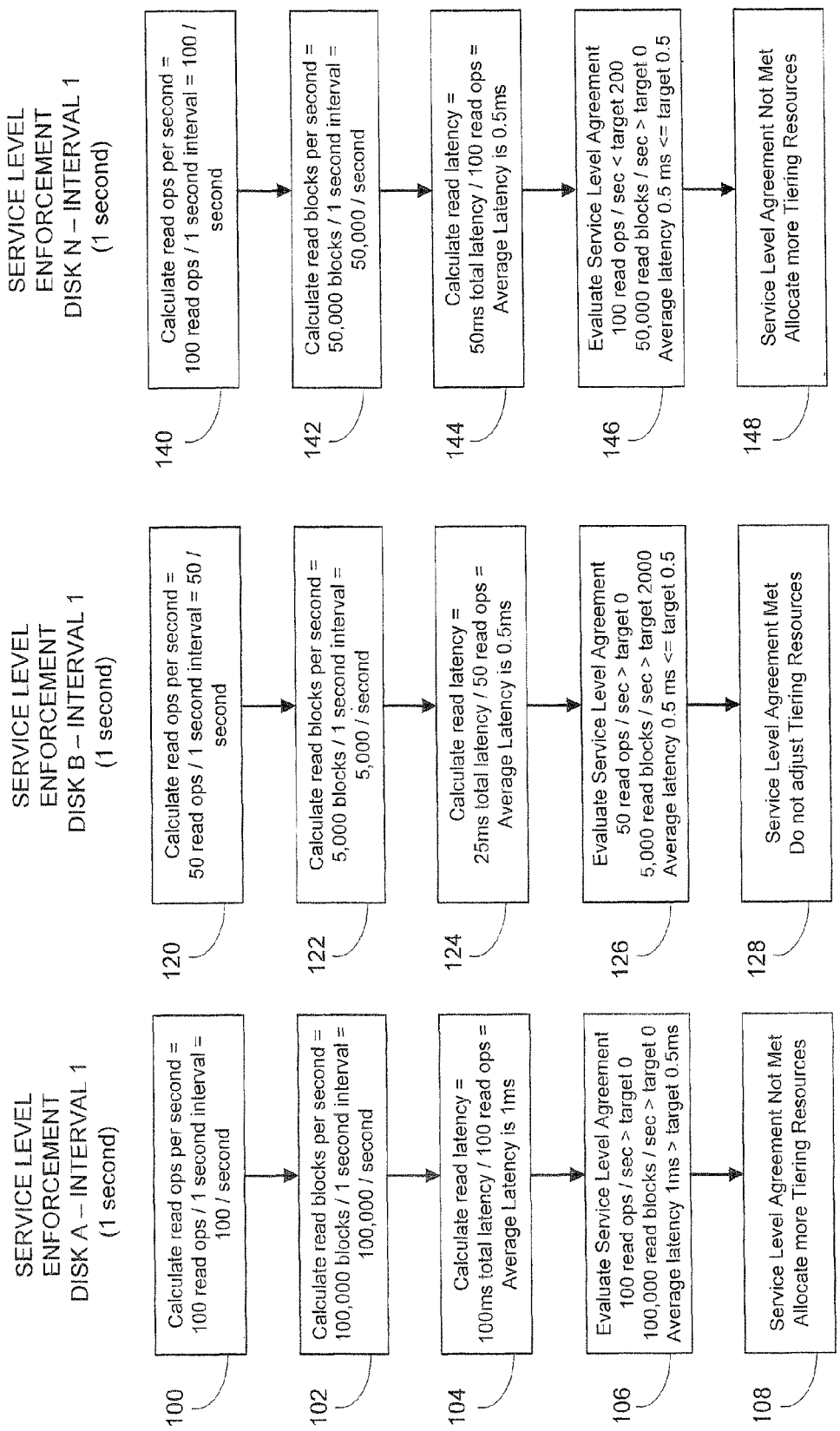

RESOURCE ALLOCATION LOGIC 80

| DISK | CURRENT RESOURCES | MAXIMUM RESOURCES | LAST ALLOCATION CHANGE |
|---|---|---|---|
| A | 1000 | 2000 | +10 |
| B | 1000 | 2000 | −100 |
| ⋮ | ⋮ | ⋮ | ⋮ |
| N | 1500 | 10000 | +500 |

ALLOCATION OF TIERING RESOURCES

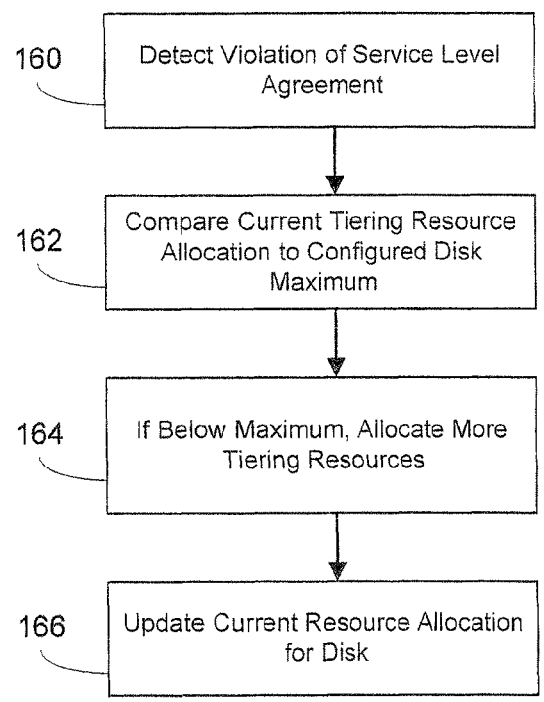

160 — Detect Violation of Service Level Agreement

162 — Compare Current Tiering Resource Allocation to Configured Disk Maximum

164 — If Below Maximum, Allocate More Tiering Resources

166 — Update Current Resource Allocation for Disk

FIG. 10

VALUE METRIC TABLE

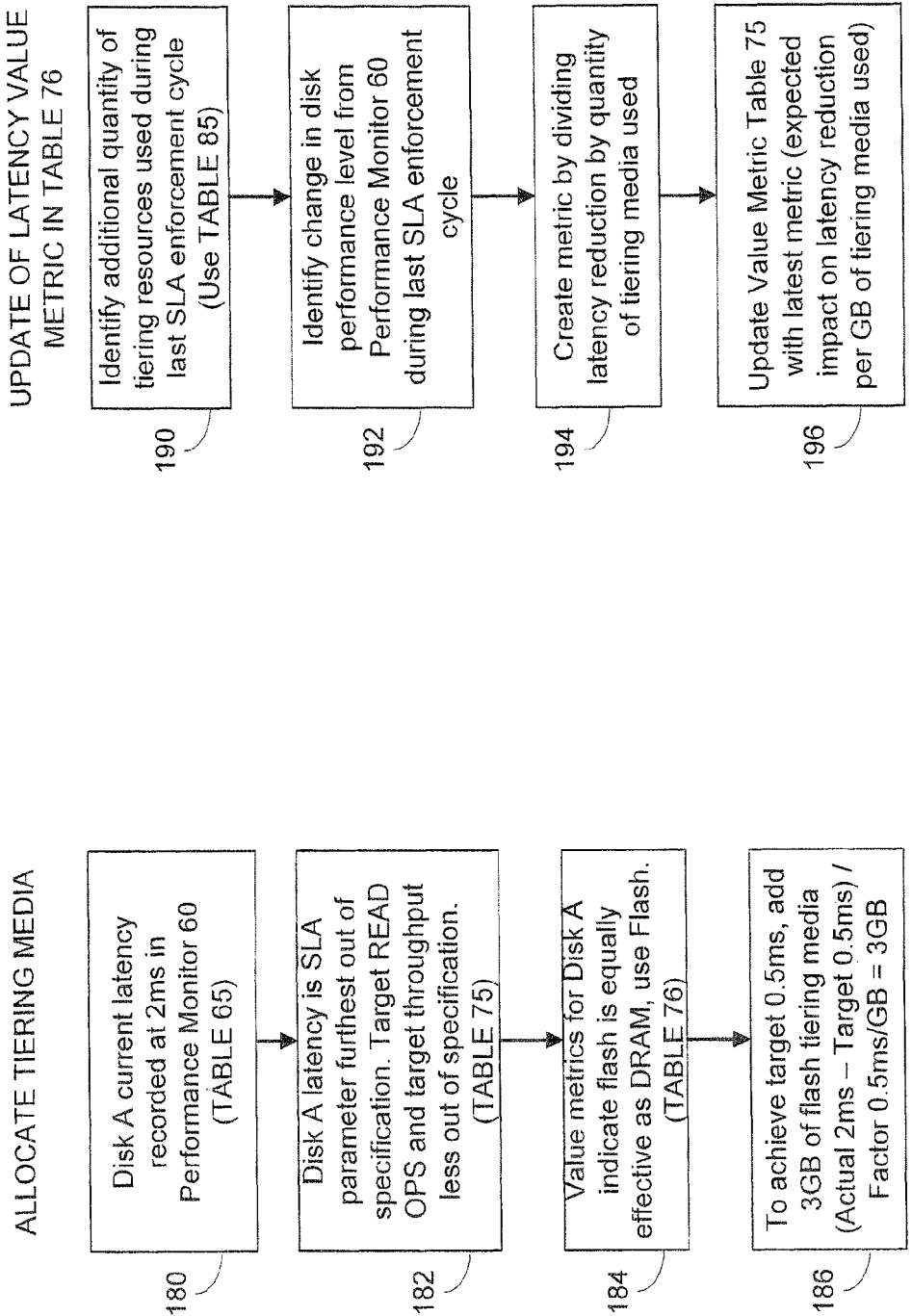

DYNAMIC PERFORMANCE VIRTUALIZATION FOR DISK ACCESS

This application claims priory to provisional patent application Ser. No. 61/114,332 filed Nov. 13, 2008 and is herein incorporated by reference in its entirety.

BACKGROUND

Block-level storage in a disk storage array is organized as volumes of logical units (LU). Servers access these disk storage array volumes as blocks. The major metrics for these volumes are:

CAPACITY—amount of available storage (in bytes);
IOPs—Input/Output operations per second (that the volume can handle);
LATENCY—time delay (from request) until data starts; and
THROUGHPUT—data rate for a particular volume.

For reference, a typical disk storage array volume using serial Small Computer System Interface (SCSI) disks may have parameters as follows:

Capacity—100 GigaBytes
Input/Outputs (IOPs)—800 random operations/sec
Latency—2 milliseconds (ms) to 4 ms
Throughput—100 Megabytes/sec Access to a disk storage array is relatively slow compared to Dynamic Random Access Memory (DRAM) or Solid State Flash (Flash) memory. As mentioned above, a memory access to disk can take several milliseconds while RAM accesses are on the order of nano-seconds and Flash memory accesses are on the order of microseconds.

BRIEF DESCRIPTION OF THE DRAWINGS

FIG. 4 shows a performance monitor used in the controller of FIG. 3.

FIG. 5 shows service enforcement logic used in the controller of FIG. 3.

FIGS. 6-8 are flow diagrams showing how the service enforcement logic of FIG. 5 enforces service level agreements.

FIG. 9 shows resource allocation logic used in the controller of FIG. 3.

FIG. 10 is a flow diagram showing operations performed by the resource allocation logic of FIG. 9.

FIGS. 12 and 13 are flow diagrams showing how the service enforcement logic and the resource allocation logic use the metric table in FIG. 11.

DETAILED DESCRIPTION

Several preferred examples of the present application will now be described with reference to the accompanying drawings. Various other examples are also possible and practical. This application may be exemplified in many different forms and should not be construed as being limited to the examples set forth herein.

Figure 1:
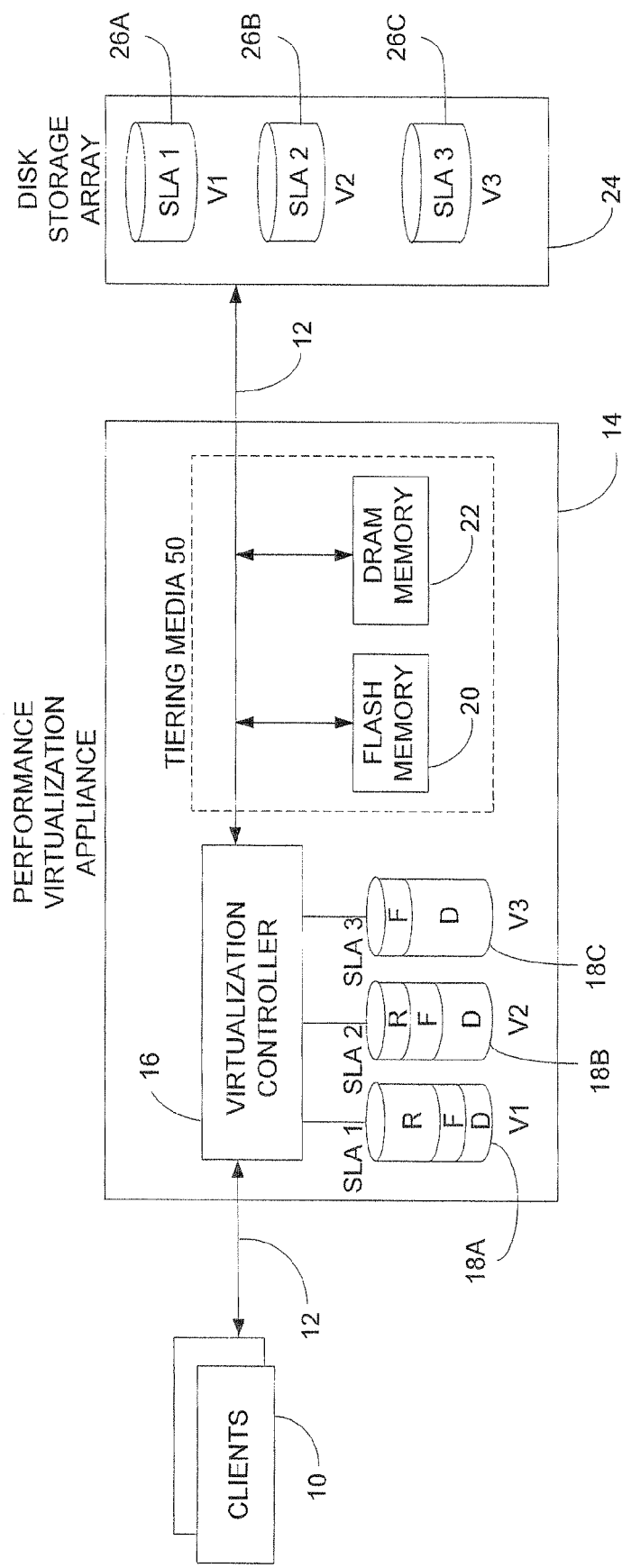
FIG. 1 is a block diagram of a Performance Virtualization Appliance (PVA) that provides dynamic performance virtualization for disk access.

Referring to FIG. 1, a performance virtualization appliance (PVA) 14 is located between one or more clients 10 and a disk storage array 24. The clients 10 may be servers, personal computers, terminals, portable digital devices, routers, switches, or any other wired or wireless computing device that needs to access data on disk storage array 24. In one embodiment, the PVA 14 and the disk storage array 24 are stand-alone appliances, devices, or blades.

In one embodiment, the clients 10, PVA 14 and disk storage array 24 might be coupled to each other via wired or wireless Internet connections 12. In another embodiment, the clients 10 may access one or more of the disks in disk storage array 24 over an internal or external data bus. The disk storage array 24 in this embodiment could be located in the personal computer or server 10, or could also be a stand-alone device coupled to the computer/server 10 via a fiber channel SCSI bus, Universal Serial Bus (USB), or packet switched network connection.

Figure 2:
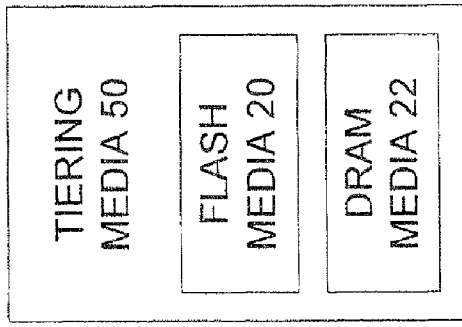
FIG. 2 is an alternative view of a tiering media shown in FIG. 1.

The PVA 14 contains one or more processors that operate as a virtualization controller 16. A tiering media 50 contains different combinations of Flash memory 20 and DRAM Memory 22 that may have faster access speeds than the disk storage array 24. FIG. 2 shows an alternative view of the tiering media 50 located in the appliance 14 that includes the Flash media 20 and DRAM media 22. The virtualization controller 16 receives read and write operations from clients 10 directed to particular storage volumes 26 in disk storage array 24. In one embodiment, the storage volumes 26 are different groups of one or more disks, storage blocks, or any other grouping of memory that may be associated with a particular Service Level Agreement (SLA). An SLA is a storage access performance level that is expected when accessing an associated storage volume in the disk storage array 24. Throughout the specification the terms storage volume and disk will be used interchangeably.

The virtualization controller 16 uses different combinations of the Flash memory 20 and the DRAM 22, in conjunction with disk storage array 24, to provide dynamic performance virtualization for the different storage volumes 26. For example, the virtualization controller 16 can dynamically or statically change the Input/Outputs (I), Latency (L), and Throughput (T) observed by the clients 10 when accessing the different storage volumes 26 in disk storage array 24. In an alternative embodiment, other measures of performance derived from I, L, and T may be used by the virtualization controller.

Different combinations of the performance parameters I, L, and T are tracked by the virtualization controller 16 and used for enforcing SLAs for different clients 10 and/or storage volumes 26. The amount of Flash 20, DRAM 22, and disk 24 allocated to a particular storage volume 26 can be dynamically varied to adaptively track the SLAs assigned to those storage volumes.

Different storage volumes 26A, 26B, and 26C can be assigned to different client data. For example, data volume 26A (V1) might be associated with the reservation data for an airline, data volume V2 may be associated with the flight schedule data for the same airline, and data volume V3 may be associated with an on-line retail store for a different client. Of course, any type of client 10 and any type of data can be associated with the different storage volumes 26.

Different SLA parameters are assigned to the different storage volumes 26. For example, volume V1 may be assigned a SLA value SLA1, storage volume V2 may be assigned a different SLA value SLA2, and volume V3 may be assigned another different SLA value SLA3. These are just examples, and any combination or gradation of SLA values can be assigned to the different volumes 26.

The virtualization controller 16 allocates different amounts 18 of Flash memory 20 and DRAM 22 to the different storage volumes 26 according to the associated SLA values. In one example, volume 26A may have a highest SLA value SLA1, volume 26B may have a lower SLA value SLA2, and volume 26C may have an even lower SLA value SLA3. A relatively high SLA value could correspond with any combination of a relatively large number of Input/Outputs (I), a relatively small Latency (L), and/or a relatively large Throughput (T). A lower SLA value may correspond to a smaller number of IOs (I), a relatively larger Latency (L), and/or a relatively smaller Throughput (T).

As mentioned above, Flash 20, DRAM 22, and disk storage array 24 have different access speeds, with DRAM 22 generally having the fastest access time, Flash having a next fastest access time, and disk storage array 24 having the slowest access time. It should also be understood that any other type of storage can be used in tiering media 50. For example, other types of Random Access Memory (Such as Ferroelectric RAM or Phase-change memory) or other relatively fast disk or solid state memory devices can also be used in tiering media 50.

The virtualization controller 16 allocates different amounts of DRAM 22 and Flash 20 to the storage volumes 26 to meet the SLA values. The memory allocations 18 are mappings stored in tables in the appliance 14 that indicate what addresses in Flash 20 and DRAM 22 are used in conjunction with the different storage volumes 26. For example, a relatively large amount of DRAM memory (R) may be identified in memory allocation 18A for storage volume 26A, since DRAM has a faster access time than Flash 20 or disk 24, in order to meet the SLA for volume 26A.

The volume 26B has a lower SLA value SLA2. Therefore, volume 26B may have a memory allocation 18B with relatively less DRAM 22 and/or Flash 20, compared with volume 26A. Volume 26C has a lowest. SLA value SLA3 and accordingly may be assigned a memory allocation 18C with little or no DRAM memory 22 and a relatively small amount of Flash memory 20. These examples are for illustrative purposes and any other combinations of DRAM 22, Flash 20, and disk 24 can be allocated to different volumes 26.

Dynamic Allocation

The virtualization controller 16 uses the memory allocations 18A, 18B, and 18C when accessing volumes 26A, 26B, and 26C, respectively. Based either at a particular time, on a particular access or access pattern to one or more block in a particular volume 26, the controller 16 may pre-fetch other blocks for the same storage volume 26 into DRAM 22 and Flash 20.

For example, the SLA1 for volume 26A may be associated with an overall response time of 500 microseconds (µs). A particular percentage of DRAM 22 and a particular percentage of Flash 20 are allocated to volume 26A that result in an overall client response time of around 500 µs. Whenever a particular block in volume 26A is accessed, or at a particular time, or when a particular data access pattern is detected, one or more blocks for the volume 26A may be loaded into the DRAM 22 and/or Flash 20 allocated to that storage volume. The DRAM 22 and/or Flash 20 are then used for any subsequent accesses to those particular blocks for that particular volume 26A.

The controller 16 continuously monitors the number of reads and writes directed to volume 26A that may either be directed to DRAM 22, Flash 20, and disk storage array 24. The overall response time associated with a storage volume 26 might be slower than 500 µs when the allocation of DRAM 22 and Flash 20 to that particular storage volume is too low. Accordingly, the controller 16 may allocate more DRAM 22 and/or Flash 20 to that particular storage volume 26A so that more data can be stored in the faster tiering media 50, more reads and writes can be serviced by the faster DRAM 22 and Flash 20, and the overall performance of storage volume 26A operates more closely to the 500 µs SLA. In the event that all tiering resources are exhausted before reaching the volume SLA, the virtualization controller has achieved the best possible performance (best effort). Configuration may allow, in one embodiment, for this best effort using all available resources to be considered as satisfying the SLA.

Conversely, the proportion of reads and/or writes to DRAM 22 and Flash 20 for volume 26A may be too large. This would correspond to an overall response time for volume 26A that is faster than the 500 µs value for SLA1. In this situation, the virtualization controller 16 may dynamically de-allocate some of the DRAM 22 and Flash 20 previously allocated to volume 26A. This would result in a fewer number of reads and writes to DRAM 22 and/or Flash 20 and slower overall memory access performance.

The particular blocks from the disk storage array 24 loaded into DRAM 22 and Flash 20 may also be dynamically or statically selected. The controller 16 may identify which blocks and/or storage volumes 26 are associated with a particular client 10 or SLA and are receiving the largest number of reads and writes. For example, a database in disk storage array 24 may have indexes that are frequently accessed when identifying customer records. The controller 16 may assign these storage volumes higher SLA values and accordingly load the blocks or volumes containing these heavily used indexes into DRAM 22 and/or Flash 20 to more efficiently utilize the memory resources for a particular client, SLA, or volume.

In another example, databases may use space on disk storage array 24 to temporarily hold data associated with a particular query. The data in this temp space is then repeatedly accessed by the client 10. The controller 16 may detect a read and write signature associated with these temporary space volumes and store the identified volumes containing the temporary space in DRAM memory 22 and Flash memory 20.

In time based dynamic allocation, the controller 16 may determine that particular volumes 26 are heavily accessed at different times of the day. For example, a particular client 10 may access particular storage volumes 26 from 9:00 am to 10:00 am. The controller 16 may automatically increase the SLA values for these storage volumes from 9:00 am to 10:00 am so that more data from these storage volumes can be pre-fetched and used in DRAM 22 and/or flash 20 from 9:00 am to 10:00 am. The controller 16 may then lower the SLA values for these volumes after 10:00 am when fewer memory accesses are expected and increased memory access performance is no longer required.

Thus, the overall efficiency of reducing memory access time is improved by allocating more relatively fast memory 20 and 22 to storage volumes with high SLA requirements and possibly reducing the SLA values for these storage volumes during periods of relatively low utilization.

Virtualization Controller

Figure 3:
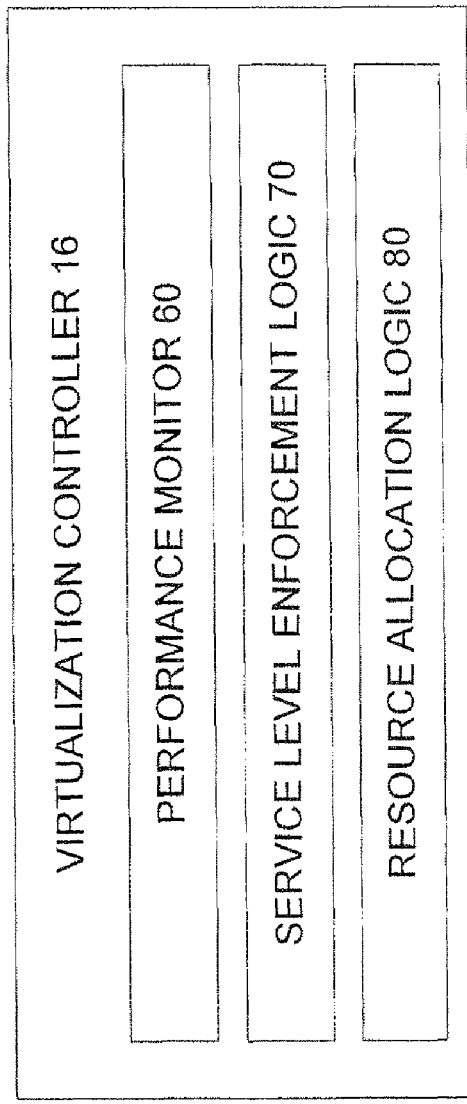
FIG. 3 shows different functional modules used in a virtualization controller shown in FIG. 1.

FIG. 3 shows different operations or functional elements of the virtualization controller 16. The operations may be performed by a programmable processor responsive to executed computer instructions or could be performed with logic circuitry, one or more programmable logic devices or an application specific integrated circuit (ASIC).

A performance monitor 60 tracks the different storage operations from the clients 10 to the storage volumes 26 in storage array 24 and determines different performance parameters for the different storage volumes 26. Service level enforcement logic 70 determines when the different storage volumes are not meeting associated Service Level Agreements (SLA). Resource allocation logic 80 allocates the tiering resources 20 and 22 to the different storage volumes 26 in FIG. 1 according to the SLA violations detected by the enforcement logic 70.

FIG. 4 shows information tracked in a storage monitor table 65 by the performance monitor 60. The performance monitor 60 obtains the parameters in table 65 by monitoring the read operations received and sent back to clients 10 in FIG. 1. The storage monitor 60 uses information contained in the disk read operations to identify what disks 26 in FIG. 1 are associated with the read operation. The information also indicate the number of blocks addressed in the read operations and the starting block of the operation.

A first timer (not shown) is used by the performance monitor 60 to track how long it takes particular disks 26 to respond to read operations. A second timer and a counter (not shown) are used to track how many read operations are completed by particular disks 26 over a predetermined time period. Another counter (not shown) is used to track the total number of blocks read during the predetermined time interval.

For the particular time intervals indicated in column 65B of table 65, the performance monitor 60 tracks the number of read operations performed on a particular disk or storage volume 26 (FIG. 1) in column 65C. The total number of storage blocks read during those read operations is tracked in column 65D, a total amount of time required to complete all of the read operations is tracked in column 65E, and an average latency for each of the read operations identified in column 65C is identified in column 65F.

For example referring to the first row in table 65, during a particular time interval 1, there were 100 read operations to disk A and a total of 100,000 blocks read from disk A. The total amount of time required to read the 100,000 blocks was 100 milliseconds (msec) and on average, each read operation took 1 msec.

A second row of table 65 shows another record for the same disk or storage volume A for a different time interval 2. For example, time interval 1 in the first row of table 65 may be 1 second. The time interval 2 in the second row of table 65 also may be 1 second, but may be taken at a different time. During time interval 2, 300 read operations were made by the clients 10 to disk A and 300,000 blocks were read. The total amount of time required to read the 300,000 blocks was 900 msec. and the average time for each of the 300 read operations was 3 msec.

FIG. 5 shows a table 75 that contains enforcement parameters used by the service level enforcement logic 70. Column 75A identifies the particular disk or storage volume 26 where enforcement is provided by logic 70. Column 75B identifies a target number of read operations that may be enforced for a particular disk. Column 75C identifies a target number of read blocks that may be enforced for a particular disk or storage volume, and column 75D identifies a target latency that may be enforced for a particular disk or storage volume. If a value in a particular column is zero, then that associated parameter may not be enforced for the associated disk.

For example, the first row in table 75 is used by the service level enforcement logic 70 to enforce an average latency of 0.5 msec on disk A. However logic 70 will not enforce a target number of read operations (column 75B) or enforce a target number of read blocks (column 75C) since these fields are zero. The second row in table 75 is used by the service level enforcement logic 70 to enforce a target number of 2000 read blocks and enforce a target latency of 0.5 msec for disk B. However, the logic 70 will not enforce a target number of read operations (column 75B) on disk B. The Nth row in table 75 is used by the service level enforcement logic 70 to enforce a target number of 200 read operations and a target latency of 0.5 msec on disk N. However, logic 70 will not enforce a target number of read blocks on disk N.

The parameters in table 75 may be preconfigured based on empirical data related to the data read patterns of the different disks 26 in storage array 24 (FIG. 1). For example, a particular disk, it may be more important to pipeline a large number of read operations back-to-back. For this disk, the SLA may only specify a particular value in the target read operation column 75B.

For another disk or storage volume, it may be more important to read a large number of blocks in a shortest amount of time. The SLA for this disk may specify a particular large value in the target read block column 75C. Alternatively, overall latency of each read operation may be a primary criteria. The SLA for this disk may specify a relatively small value in column 75D. Any combination of the above parameters may be specified for any combination of disks.

FIGS. 6-8 describe in more detail how the service level enforcement logic 70 operates. FIG. 6 shows one example of how service level enforcement is performed for disk A according to the 1 second time interval indicated in table 65. In operation 100, logic 70 calculates the number of read operations per second provided by disk A by dividing the number of read operations (100) in column 65C by the 1 second time interval in column 65B. In operation 102, the number of blocks read per second is calculated by dividing the total number of blocks read for disk A in column 65D (100,000) by the 1 second time interval. Operation 104 calculates the average read latency for disk A as 1 msec by dividing the total read latency in column 65E (100 msec) by the number of read operations in column 65C (100).

In operation 106 the enforcement logic 70 compares the tracked values with the target enforcement parameters in table 75. For example, for disk A the number of read operations/sec=100 and the target read operations/sec in column 75B for disk A is 0. No SLA has been violated since 100>0. The number of tracked read blocks/sec=100,000 for disk A and the target read blocks for disk A in column 75C is 0. No service level agreement has been violated since 100,000>0.

The average latency for disk A over the 1 second time period was 1 msec. However the target average latency for disk A is 0.5 msec. Because 1 msec>0.5 msec, the enforcement logic 70 in operation 108 determines that the service level agreement for disk A has been violated. In response to the SLA violation indication, the resource allocation logic 80 in FIG. 3 will allocate more tiering media 50 to disk A. The allocation process will be described in more detail below in FIGS. 9-13.

FIG. 7 shows another example of how the service level enforcement is performed for disk B according to the measurements in the third row of table 65 in FIG. 4. In operation 120, logic 70 calculates the number of read operations per second by dividing the number of read operations (50) by the 1 second time interval. In operation 122, the number of blocks read per second is calculated by dividing the total number of blocks read for disk B in column 65D (5,000) by the 1 second time interval. Operation 124 calculates the average read latency for disk B by dividing the total read latency in column 65E of table 65 (25 msec) by the total number of read operations in column 65C (50)=0.5 msec.

In operation 126 the enforcement logic 70 compares the derived values with the target enforcement parameters in table 75. For disk B, the number of read operations/sec=50 and the target number of read operations/sec in column 75B is 0. No service level agreement has been violated since 50>0. For disk B, the number of read blocks/sec=5,000 and the target read blocks for disk B in column 75C is 2000. Since 5,000>2000, there is no violation of the SLA.

The average latency for disk B over the 1 msec time period is 0.5 msec and the target latency for disk B in column 75D is also 0.5 msec. Because the measured average latency 0.5 msec≦the 0.5 msec target latency in table 75, disk B currently does not violate the target latency in the SLA.

The enforcement logic 70 in operation 128 indicates that disk B does not currently violate the associated SLA. In response, the resource allocation logic 80 will not make any adjustments to the tiering media 50 currently allocated to disk B during the next allocation period.

FIG. 8 shows another example of how SLA enforcement is performed for disk N according to the measurements in the Nth row of table 65 in FIG. 4. In operation 140, the number of read operations (100) is divided by the 1 second time interval. In operation 142, the total number of blocks read for disk N in column 65D (50,000) is divided by the 1 second time interval. Operation 144 calculates the average read latency for disk N by dividing the total read latency in column 65E of table 65 (50 msec) by the total number of read operations in column 65C (100)=0.5 msec.

In operation 146 the enforcement logic 70 compares the derived values with the target parameters in table 75. For disk N the measured number of read blocks/sec=50,000>the target number of read blocks for disk N=0. This is determined not to be a violation of the SLA. The average latency for disk N over the 1 msec time period is 0.5 msec which is ≦ than the target latency of 0.5 msec in column 75D. This is also determined not to be a violation of the service level agreement by the enforcement logic 70.

However, for disk N the total number of read operations/sec=100 and the target number of read operations/sec in column 75B is 200. Because, 100 read ops/sec<200 read ops/sec, a service level agreement violation is indicated in operation 148.

FIG. 9 explains how the resource allocation logic 80 allocates tiering media to disks that have violated their SLAs in table 75. Table 85 lists particular disks in column 85A and a current amount of tiering media currently allocated by those particular disks in column 85B. For example, the amount of Flash memory 20 and DRAM 22 currently allocated to disk A is indicated as 1000 Gigabytes (GB) in column 85B. The values in column 85B could be one value that represents a combined amount of Flash 20 and DRAM 22 allocated to the associated disk or there could include separate numbers identifying each different type of tiering media.

The maximum resource values in column 85C indicate a limit on the amount of tiering resources that can be assigned to a particular disk or storage volume 26. For example, based on the particular SLA associated with disk A, column 85C indicates that a maximum of 2000 GB of tiering media 50 may be allocated to disk A. Again, there may be separate numbers in column 85C for Flash 20 and DRAM 22. Column 85D indicates how much tiering media was added or removed during a last enforcement period. For example, during a last allocation session, disk A was allocated an additional 10 GBs of tiering media.

FIG. 10 is a flow diagram that explains in more detail how the resource allocation logic 80 operates. A violation of a service level agreement for one or more disks is detected in operation 160 as described above in FIGS. 6-8. Upon detection of the violation, the current tiering resource allocation for that particular disk identified in column 85B is compared with the maximum resource allocation identified in column 85C. If the current amount of allocated resources is below the maximum allowable allocation in operation 164, more tiering media may be allocated to the disk. Operation 166 then updates table 85 to reflect the additional allocation. Otherwise, no additional tiering media is allocated.

The tiering media 50 is allocated by assigning additional address ranges either in the Flash 20 and/or DRAM 22 to the associated disk or storage volume 26 (FIG. 1). The virtualization controller 16 or some other processing element in the appliance 14 (FIG. 1) uses the additional allocated tiering media 50 for prefetches, look-aheads, or any other type of local storage of data associated with that particular disk. For example, allocating more tiering media 50 to disk A, allows more data from disk A to be stored in the faster tiering media 50. This can then result in an over reduction in read latency, an overall increase in the number of read operations that can be completed, or an increase in the number of blocks that can be read over a particular time period.

At least one example of particular use of the tiering media is described in co-pending application Ser. No. 12/605,160, filed Oct. 23, 2009, entitled BEHAVIORAL MONITORING OF STORAGE ACCESS PATTERNS, which is herein incorporated by reference in its entirety.

Figure 11:
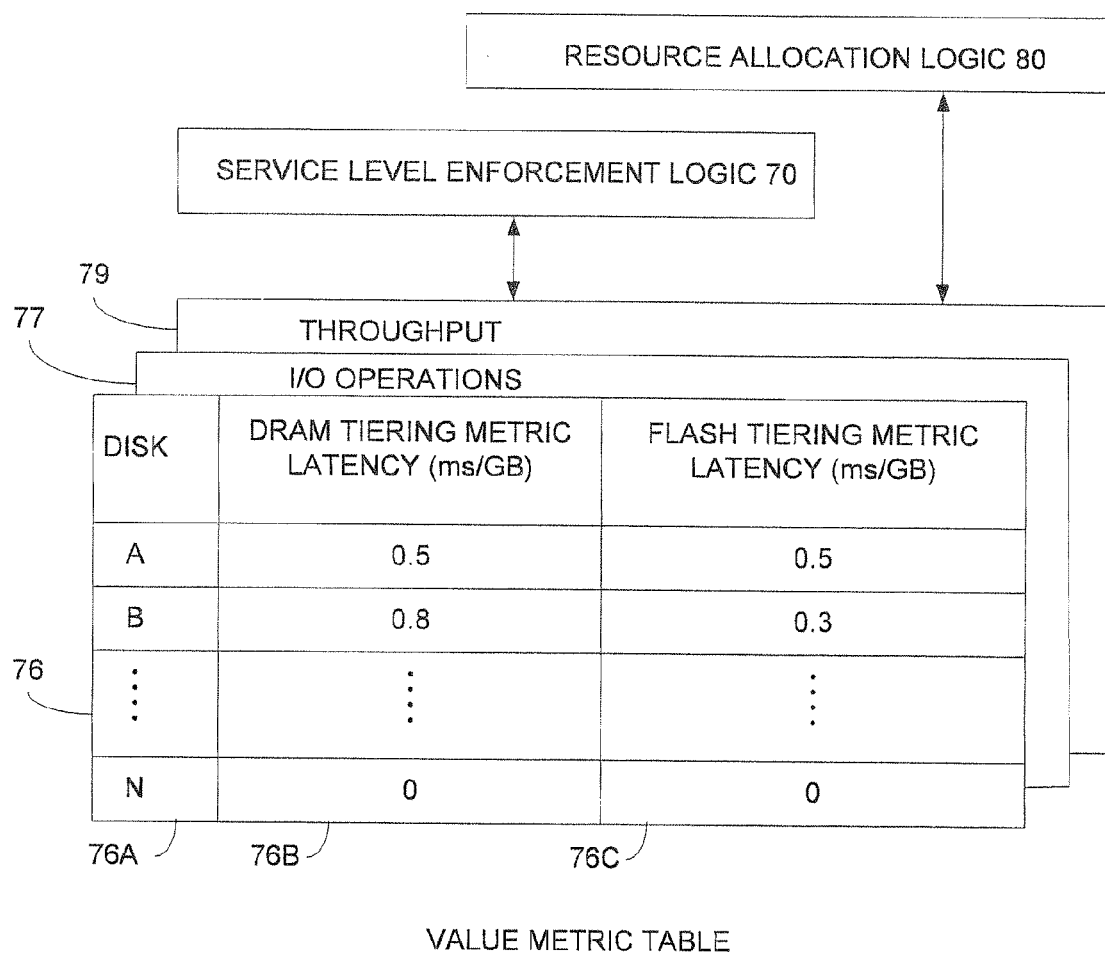
FIG. 11 shows a metric table used.

FIG. 11 shows different performance metrics contained in a value metric table 76. There can any number of tables each associated with a different type of performance metric. For example, table 76 contains latency performance metrics for each storage volume. Other tables 77 and 79 include number of read operations per second (I/O Ops) and number of blocks read per second (throughput) metrics, respectively. The metric tables are used by the enforcement logic 70 and allocation logic 80 and determine how much tiering media 50 to allocate to disks that violate their SLA parameters in table 75.

In the example shown in FIG. 11, the parameters in column 76B predict that every Gigabyte (GB) of DRAM allocated to disk A will approximately reduce the average latency of each read operation associated with disk A by 0.5 msec, reduce the average latency of each read operation associated with disk B by 0.8 msec, and have no effect on disk N. The parameters in column 76C indicate that allocating an additional 1 GB of Flash memory to disk A will reduce the average latency of each read operation associated with disk A by approximately 0.5 msec, reduce the average latency of each read operation associated with disk B by approximately 0.3 msec, and have no latency effect on disk N.

The metrics in table 76 are obtained either from empirical data monitored for previous accesses to these particular disks or are dynamically created and periodically updated based on the prior monitoring of the latency, I/O, and throughput performance of the different disks in table 65 of FIG. 4. This will be described in more detail below in FIGS. 12 and 13.

Table 76 indicates that both DRAM 22 and Flash 20 provide that same levels of latency improvement for disk A. In this situation, the allocation logic 80 may assign Flash 20 to disk A whenever there is a SLA violation. This may be the case when there is more Flash available than DRAM and/or when the DRAM 22 is faster than the Flash media 20. In other words, whenever different tiering media 50 provide similar performance improvements, the allocation logic 80 may allocate the slower and/or more plentiful type of tiering media to the violating storage volume.

The metric values in table 76 also indicates that allocation of 1 GB of additional DRAM to disk B provides a 0.8 msec reduction in the average read latency where Flash 20 only provides a 0.3 msec improvement. Accordingly, the allocation logic 80 may tend to allocate more DRAM 22 to disk B since DRAM 22 is more efficient at reducing the latency of read operations from disk B.

The metric values in table 76 also indicate that allocating additional DRAM 22 or Flash 20 to disk N will not further reduce the latency of read operations from disk N. This may be the case when read accesses to disk N are always being performed from different random areas/blocks in disk N. In this situation, temporarily storing portions of the data from disk N into tiering media 50 may not provide any reduction in read latency since each new read operation will still have to access disk N in storage array 24 (FIG. 1). Therefore, the allocation logic 80 will not allocate any more Flash 20 or DRAM 22 to disk N, even though disk N may currently be in violation of an associated SLA.

FIG. 12 shows how the parameters in tables 65, 75, 76, and 85 are used by the enforcement logic 70 and allocation logic 80 for allocating tiering media. In operation 180 the enforcement logic 70 may identify the current average latency for disk A recorded in table 65 of FIG. 4 as 2 msec. In operation 182 the enforcement logic 70 uses table 75 in FIG. 5 to determine that disk A is the biggest SLA violator. In this example, the current 2.0 msec latency for disk A is furthest away from the associated target latency of 0.5 msec indicated in column 75D of table 75. Similar analysis can be performed for the target number of read operations in column 75B of table 75 and/or for the target block throughput parameters in column 75C of table 75.

In one embodiment, different target values in table 75 may have different priorities. For example, a violation of target latency in column 75D may have a higher priority than a violation of the target read operations in column 75B or the target throughput in column 75C. In this case, the tiering media would first be allocated to the disks that are most severely violating the target latency SLA. Otherwise the different SLA parameters in table 75 may be combined to determine which disks are the worst violators of the SLAs.

In operation 184 the allocation logic 70 uses tables 76, 77, and 78 in FIG. 11 to determine what type and how much tiering media to assign to disk A. For example, table 76 indicates that Flash 20 and DRAM 22 are equally effective in reducing read operation latency. The allocation logic in operation 186 then uses the metric in column 76C for disk A to determine how much additional Flash media 20 to allocate to disk A.

In this example, disk A has a latency metric of 0.5 msec per GB of Flash 20. As previously determined in operation 180, the current average read latency for disk A is 2.0 msec. The allocation logic 80 divides the amount of SLA violation (2 msec−0.5 msec=1.5 msec) by the Flash latency metric (0.5 msec/GB) and determines that an additional 3 GB of Flash 20 should be allocated to disk A.

The allocation logic 80 may also compare the maximum resource value in table 85 in FIG. 9 to confirm the identified additional amount of Flash 3 GB does not exceed the maximum allowable allocated resources in column 85C (2000 GB) for disk A. If the additional tiering media does not exceed the maximum, an additional 3 GB of Flash memory 20 is allocated to disk A in operation 186 and the resources identified as currently allocated to disk A in column 85B of table 85 is increased by 3 GBs.

FIG. 13 shows how the metric values in table 76 are derived by the enforcement logic 70. As described above, the resource allocation logic 80 records the amount of tiering resources currently being used by a particular disk in table 85. Allocation logic 80 also records in column 85D of table 85 the amount of additional tiering media allocated or deallocated from a particular disk during a last SLA enforcement cycle. For example, table 85 indicates that an additional 10 GBs of tiering media were allocated to disk A during the last SLA enforcement cycle.

The performance monitor 60 in table 65 of FIG. 4 also records changes in the average latency for particular disks since a last SLA enforcement cycle. For example, table 65 indicates a change in the average latency for disk A from time period 1 to time period 2 increased by 2 msec.

In operation 190, the enforcement logic 70 uses table 85 to identify the amount of tiering resources allocated or deallocated to or from particular disks during the last SLA enforcement cycle. In operation 192 the enforcement logic 70 uses column 65F in table 65 to determine the change in average latency for particular disks since the last SLA enforcement cycle. In operation 194 the metrics for table 76 are derived by dividing the change in average read latency by the amount of last allocated memory. For example, 2 GBs of Flash 20 may have been allocated to disk A during a last SLA enforcement cycle and the average latency for disk A may have been reduced by 0.5 msec. Therefore, the Flash tiering metric latency in column 76C of FIG. 11 for disk A may be updated in operation 196 to 0.5 msec/2.0 GB=0.25 msec/GB.

The metric values in table 76 may be determined based on averaging the amount of allocated tiering media and averaging the associated changes in latency, read operations, and block for multiple different SLA enforcement cycles. This reduces large fluctuations in tiering media allocations. Alternatively, the parameters used in table 76 may be normalized.

It should also be noted that the allocation logic 80 may also deallocate tiering media from particular storage volumes. For example, value metric table 76 may include zero and negative numbers indicating that the previous tiering media allocation provided no performance improvement or made the performance of the storage volume worse. The allocation logic 80 may then deallocate some of the tiering media from the particular disks that have little, none, or negative performance improvements when tiering media is allocated.

The virtualization controller 16 in FIG. 1 more efficiently and effectively utilizes tiering media resource 50. For example, tiering media 50 will not be assigned to storage volumes when allocating additional tiering media does not result in any improvements in storage access performance. Further, when tiering media 50 is determined to increase storage access performance, the virtualization controller 16 further increases tiering media efficiency by determining which of the different types of Flash 20 and DRAM 22 provides the best performance results for different storage volumes.

Alternative Embodiments

Figure 14:
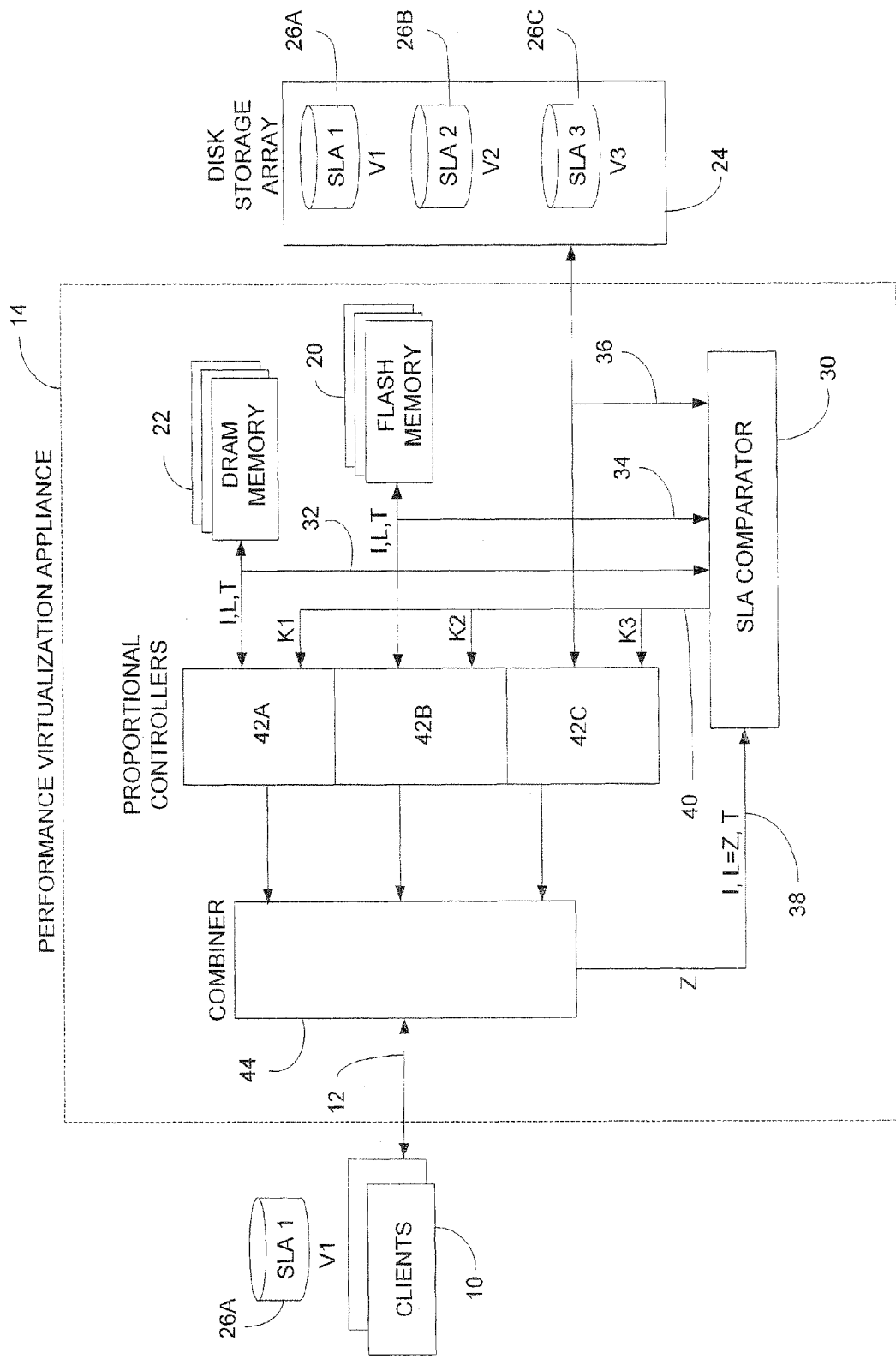
FIG. 14 shows another embodiment of the PVA.

FIG. 14 shows an alternative embodiment of the performance virtualization appliance 14 that performs other SLA enforcement operations. An SLA comparator 30 measures the IOPs (I), Latency (L), and Throughput (T) parameters 32 and 34 for the DRAM 22 and Flash 20, respectively. The SLA comparator 30 also measures the I, L, and T parameters 36 for the disk storage array 24 and measures the I, L, and T parameters 38 seen by the server 10.

These parameters can be determined by the SLA comparator 30 by monitoring read and write commands to the different memory devices 20, 22, and 24 and then determining when a corresponding response is returned by that memory device. For example, a write command to volume 26A may be sent from one of the clients 10 to DRAM 22. The SLA comparator 30 detects the write command to DRAM 22 and then determines when a corresponding write acknowledge is generated by DRAM 22. Similarly, when a read command is detected, the SLA comparator 20 can determine when the memory device responds back with the data addressed by the read command.

It should be noted that the I, L, and T values for the different memory devices 20, 22, and 24 can vary depending on how much memory space is allocated, where the data for a particular volume is located, what types of read and write operations are requested, how much data is associated with the memory access, etc. Accordingly, monitoring the I, L, and T values in real-time allows the SLA comparator 30 to constantly monitor and determine if the overall SLA value is being provided for a particular volume 26.

A combiner 44 combines the performance values from DRAM 22, Flash 20, and disk storage array 24 at any given instant to determine if the PVA 14 is providing the overall SLA value requested by the client 10. For example, the average values for I, L, and T for each memory device 20, 22, and 24 may be combined pro-rata according to the amount of data accesses for each memory device over a particular period of time.

For example, if 30% of the memory accesses for a particular volume 26 are from DRAM 22, then the average DRAM access time for a particular time period may be given 30% of the overall weighting for the overall latency value. The average access times for Flash 20 and disk storage array 24 are given similar weights according to the percentage of accesses for that same time period. The combined I, L, and T values 38 are then used to determine if the SLA value for a particular volume is currently being provided.

The SLA comparator 30 outputs K parameters 40 according to the identified I, L, T values 32, 34, 36, and 38. Proportional controllers 42A, 42B, and 42C use the K parameters K1, K2, and K3, respectively, from the SLA comparator 30 to determine how much RAM 22 and Flash 20 should be used at any given instant.

Assume that the DRAM 22 has a latency value (L) of 1 micro-second ($\mu S$). For example, a read and/or write from DRAM 22 takes 1 $\mu s$ before the data is available/acknowledged. Also assume that Flash 20 has a 250 $\mu S$ latency for read/write, and the disk storage array 24 has a read/write latency of 5 milli-seconds (5,000 $\mu S$).

Also assume that the volume 26A is 100 Giga-Bytes (GB) and a particular user has requested an SLA of 100 $\mu S$ latency (L) for the volume 26A. The PVA 14 uses a measurement and operation interval of T measured in time units. For example, the time interval T may be 60 seconds. The overall measured value of L at the output of the combiner 44 is referred to as Z and is the latency for volume 26A seen by the client 10.

The SLA comparator 14 strives to maintain a particular ratio of K1 and K2. K1 is the coefficient output from the SLA comparator 30 to the proportional controller 42A for RAM 22. K2 is the coefficient output from the SLA comparator 30 to the proportional controller 42B for Flash 20. A value $K3=1-(K1+K2)$ is the coefficient output from the SLA comparator 30 to the proportional controller 42C for the disk storage array 24.

The SLA comparator 30 generates K1 and K2 values so that the overall latency $Z=100$ $\mu S$ (where $Z=K1*1+K2*250+K3*5000$). For example, if the overall value of Z is slower than 100 $\mu S$, the SLA comparator 30 may increase the value of K1 and reduce the value of K2 and/or K3. This has the overall effect of reducing the overall latency Z.

The K1, K2, and K3 values 40 are used by the proportional controllers 42A, 42B, and 42C, respectively, to vary the amounts of DRAM 22, Flash 20, and disk storage array 24 used for a particular volume 26A. For example, a particular amount of DRAM 22 may be associated with the current K1 value used by controller 42A. If the SLA comparator 30 increases the current K1 value, the controller 42A may load a larger amount of volume 26A into DRAM 22.

If the overall latency Z is less than the SLA1, then the comparator 30 may decrease the K1 value and/or increase the K2 value. This may cause the controller 42A to de-allocate some of the DRAM 22 for volume 26A and/or cause controller 42B to allocate more Flash 20 to volume 26A.

For reads from the client 10, relevant data is pre-loaded, pre-fetched, or continuously cached in DRAM 22 and Flash 20 by the proportional controllers 42 according to the K values 40. For writes, the controllers 42A and 42B accept a certain amount of write data into DRAM 22 and Flash 20, respectively, according to the K values 40 and later write the stored write data back to the disk storage array 24.

If a K1 and/or K2 value is dynamically increased, the corresponding controller 42A and/or 42B either pre-fetches more of the corresponding volume 26 from disk storage array 24 into DRAM 22 and/or Flash 20; or writes more data for that volume from the clients 10 into DRAM 22 and/or Flash 20.

If a K1 and/or K2 value is dynamically decreased for a particular volume 26, the corresponding controller 42A and/or 42B either down-loads more of that corresponding volume from DRAM 22 and/or Flash 20 back into disk storage array 24 or directs more write data for that volume from clients 10 into disk storage array 24.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We/I claim all modifications and variation coming within the spirit and scope of the following claims.

We claim:

1. An apparatus, comprising:
   logic circuitry configured to:
   identify service level agreements associated with different storage volumes;
   monitor storage access performance for the different storage volumes;
   compare the storage access performance with the service level agreements associated with the different storage volumes; and
   allocate tiering media to the different storage volumes and allocate more tiering media to the different storage volumes in response to the storage access performance not meeting the service level agreements for the different storage volumes.

2. The apparatus according to claim 1 wherein the logic circuitry is further configured to:
   calculate metrics identifying changes in the storage access performance for the different storage volumes in response to changes in the allocation and reallocation of the tiering media to the different storage volumes; and deallocate some of the tiering media for the different storage volumes that have metrics indicating no change or negative changes in the storage access performance.

3. The apparatus according to claim 1 wherein the logic circuitry is further configured to allocate different amounts of the tiering media to the different storage volumes independently of a volume of data stored in the tiering media allocated to the different storage volumes.

4. The apparatus according to claim 1 wherein the storage access performance comprises a number of read operations provided by the storage volumes within associated time periods, an amount of time required to complete the read operations to the storage volumes, and amounts of data transferred from the storage volumes during associated time periods.

5. The apparatus according to claim 1 wherein the logic circuitry is further configured to determine a number of blocks provided by the different storage volumes over associated time intervals and allocate different amounts of the tiering media to the different storage volumes according to the number of blocks provided by the different storage volumes.

6. The apparatus according to claim 1 wherein the service level agreements identify a target number of read operations, a target number of read blocks, or a target average read latency for the different storage volumes and the logic circuitry is further configured to allocate different amounts of the tiering media to the different storage volumes based on storage access performance for the different volumes reaching the target number of read operations, the target number of read blocks, or the target average read latency for the different storage volumes.

7. An apparatus, comprising:
a set of tiering media; and
logic circuitry configured to:
identify service level agreements associated with different storage volumes;
monitor storage access performance for the different storage volumes;
compare the storage access performance with the service level agreements associated with the different storage volumes; and
allocate different portions of the tiering media to the different storage volumes according to the comparisons between the storage access performance and the service level agreements associated with the different storage volumes, wherein:
the tiering media includes a first type of memory and a second type of memory; and
the logic circuitry is configured to calculate first metrics for the first type of memory and second metrics for the second type of memory and allocate the first type of memory and the second type of memory to the different storage volumes according to the first metrics and the second metrics.

8. The apparatus according to claim 7 wherein the first type of memory comprises Dynamic Random Access Memory (DRAM) and the second type of memory comprises Flash memory.

9. An apparatus, comprising:
logic circuitry configured to:
identify service level agreements associated with different storage volumes;
monitor storage access performance for the different storage volumes;
compare the storage access performance with the service level agreements associated with the different storage volumes;
allocate different portions of the tiering media to the different storage volumes according to comparisons between the storage access performance and the service level agreements for the different storage volumes;
identify violation values for the different storage volumes indicating how badly the different storage volumes violate the associated service level agreements; and
prioritize allocation of the tiering media to the different storage volumes according to the violation values.

10. A method, comprising:
monitoring memory access operations between clients and disks in a disk storage array;
calculating performance metrics for tiering media used in conjunction with the memory access operations, wherein the performance metrics identify a change in performance for the memory access operations responsive to allocation of the tiering media to the disks in the disk storage array;
allocating the tiering media to the disks in the disk storage array according to the performance metrics;
identifying metric values for the disks identifying amounts of change in the performance metrics and amounts of the tiering media allocated to the disks; and
using the metric values to determine amounts of the tiering media to allocate to the disks or amount of the tiering media to deallocate from the disks.

11. The method according to claim 10 wherein the metric values identify ratios between changes in average read latency for the disks for given time periods and previous amounts of the tiering media allocated to the disks.

12. The method according to claim 10 wherein the metric values identify ratios between changes in a number of read operations provided by the disks for associated time periods and previous amounts of the tiering media allocated to the disks.

13. The method according to claim 10 wherein the metric values identify ratios between changes in a number of blocks transferred by the disks for associated time periods and previous amounts of the tiering media allocated to the disks.

14. A method, comprising:
monitoring memory access operations between clients and disks in a disk storage array;
calculating performance metrics for tiering media used in conjunction with the memory access operations, wherein the performance metrics identify changes in performance for the memory access operations responsive to allocation of the tiering media to the disks in the disk storage array; and
allocating the tiering media to the disks in the disk storage array according to the performance metrics, wherein the memory access operations include a number of read operations provided by a particular disk within a given time period, an amount of time required to complete the read operations to the particular disk, and an amount of data transferred from the particular disk during the given time period.

15. A method, comprising:
monitoring memory access operations between clients and disks in a disk storage array;
calculating performance metrics for tiering media used in conjunction with the memory access operations, wherein the performance metrics identify changes in performance for the memory access operations responsive to allocation of the tiering media to the disks in the disk storage array;
identifying performance targets for the disks in the disk storage array;

identifying actual performance values for the disks;

comparing the actual performance values with the performance targets; and allocating the tiering media to the disks according to how much the actual performance values for the disks differ from the performance targets for the disks.

16. The method according to claim 15 further comprising:

allocating amounts of tiering media to the disks when the actual performance values for the disks are below the performance targets for the disks;

measuring how much the actual performance values change due to the amounts of tiering media allocated to the disks; and allocating or deallocating additional amounts of tiering media to the disks according to how much the actual performance values change for the disks.

17. The method according to claim 16 further comprising:

assigning maximum limits on the amounts of tiering media that can be allocated to the disks;

identifying total amounts of tiering media currently allocated to the disks; and allocating the additional amounts of tiering media to the disks only when the total amounts of tiering media are below the maximum limits.

18. The method according to claim 16 further comprising:

storing metric values for the disks identifying ratios between amounts of change in the actual performance values and the amounts of tiering media allocated to the disks; and using the metric values to determine the additional amounts of tiering media to allocate to the disks.

19. A storage control system, comprising:

an appliance configured to receive storage access requests from one or more clients and transfer some of the storage access requests to a storage array;

local tiering media;

a controller configured to:

track performance parameters for different volumes in the storage array, wherein the performance parameters indicate how fast the different volumes respond to the storage access requests, how many storage access requests are serviced by the different volumes over associated time intervals, or how much data is transferred by the different volumes over associated time intervals;

assign target performance parameters to the different volumes; and allocate the tiering media according to the performance parameters and the target performance parameters for the different volumes.

20. The storage control system according to claim 19 wherein the controller is further configured to:

generate metrics for the different volumes identifying how much the performance parameters change for the different volumes responsive to how much of the tiering media is allocated to the different volumes; and allocate the tiering media according to the performance parameters for the different volumes, the target performance parameters assigned to the different volumes; and the metrics for the different volumes.

21. An apparatus, comprising:

a controller operating on an appliance configured to:

identify service level agreements associated with storage volumes;

monitor first storage access performances for storage accesses to the storage volumes;

allocate tiering media to the storage volumes based on a comparison of the first storage access performance with the service level agreements;

monitor second storage access performances for storage accesses to the tiering media allocated to the storage volumes;

identifying differences between the first storage access performances and the second storage access performances; and allocating different amount of the tiering media to the storage volumes based on the differences between the first storage access performances and the second storage access performances.

\* \* \* \* \*